United States Patent
Lee et al.

(10) Patent No.: US 9,398,329 B2
(45) Date of Patent: Jul. 19, 2016

(54) VIDEO MANAGEMENT AND CONTROL IN HOME MULTIMEDIA NETWORK

(75) Inventors: Dongyun Lee, Sunnyvale, CA (US); Edward Pak, Saratoga, CA (US); John Hahn, Los Altos, CA (US); Mayank Gupta, Sunnyvale, CA (US); Byoung Woon Kim, Cupertino, CA (US); Paul Daniel Heninwolf, San Carlos, CA (US); Sangwan Kim, Sunnyvale, CA (US); Sukjae Cho, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 234 days.

(21) Appl. No.: 13/521,762

(22) PCT Filed: Jan. 12, 2011

(86) PCT No.: PCT/US2011/021030
§ 371 (c)(1),
(2), (4) Date: Feb. 14, 2013

(87) PCT Pub. No.: WO2011/088153
PCT Pub. Date: Jul. 21, 2011

(65) Prior Publication Data
US 2013/0191872 A1    Jul. 25, 2013

Related U.S. Application Data

(60) Provisional application No. 61/294,476, filed on Jan. 12, 2010.

(51) Int. Cl.
*H04N 21/436* (2011.01)
*H04N 21/4363* (2011.01)
(Continued)

(52) U.S. Cl.
CPC ...... *H04N 21/43615* (2013.01); *G06F 13/4286* (2013.01); *H04N 21/43632* (2013.01);
(Continued)

(58) Field of Classification Search
CPC ............ H04N 21/43615; H04N 21/63; H04N 21/43632; H04N 21/43635; G09G 2370/12; G09G 2370/047
USPC ..................... 725/78, 131, 139, 151
See application file for complete search history.

(56) References Cited

U.S. PATENT DOCUMENTS 4,575,714 A  3/1986 Rummel
5,148,144 A  9/1992 Sutterlin et al.
(Continued)

FOREIGN PATENT DOCUMENTS

CN   1604562 A   4/2005
CN   1655132 A   8/2005
(Continued)

OTHER PUBLICATIONS

Hirofuchi T. et al., "USB/IP—a Peripheral Bus Extension for Device Sharing over IP Network," Proceedings of the Usenix Annual Technical Conference, Jan. 1, 2005, pp. 47-60, XP007901448.
(Continued)

*Primary Examiner* — Ricky Chin
(74) *Attorney, Agent, or Firm* — Fenwick & West LLP

(57) ABSTRACT

A system may include a video link and a hybrid link that connects a transmitting device to the receiving device, and at least one intermediate hop between the transmitting device and the receiving device. The intermediate hop may be configured to relay video content from the video source to the video sink through the hybrid link using one or more data relay modes. The hybrid link may be configured to perform hybrid link control signaling (HLCS) to manage a physical layer of the hybrid link. The video link between the video source and the video sink may be configured to transmit a video stream the from video source to the video sink over one or more video lanes. A video link training may be implemented for the video link and the hybrid link.

24 Claims, 10 Drawing Sheets

(51) Int. Cl.
*G06F 13/42* (2006.01)
*H04N 21/63* (2011.01)
*H04L 12/28* (2006.01)

(52) U.S. Cl.
CPC ......... *H04N21/43635* (2013.01); *H04N 21/63* (2013.01); *G09G 2370/047* (2013.01); *G09G 2370/12* (2013.01); *H04L 12/2838* (2013.01); *H04L 2012/2849* (2013.01)

(56) References Cited

U.S. PATENT DOCUMENTS

| | | | |
|---|---|---|---|
| 5,428,752 | A | 6/1995 | Goren et al. |
| 5,541,957 | A | 7/1996 | Lau |
| 5,783,926 | A | 7/1998 | Moon et al. |
| 5,983,288 | A | 11/1999 | Visee |
| 6,144,399 | A | 11/2000 | Manchester et al. |
| 6,339,831 | B1 | 1/2002 | Sugawara et al. |
| 6,567,007 | B1 | 5/2003 | Fritsche et al. |
| 6,836,546 | B1 | 12/2004 | Willer |
| 6,914,637 | B1* | 7/2005 | Wolf et al. ............... 348/473 |
| 7,254,734 | B2 | 8/2007 | Lehr et al. |
| 7,295,578 | B1 | 11/2007 | Lyle et al. |
| 7,502,878 | B1 | 3/2009 | Wright |
| 7,639,765 | B2 | 12/2009 | Suzuki et al. |
| 7,856,561 | B2 | 12/2010 | Stineman et al. |
| 7,916,780 | B2 | 3/2011 | Lee |
| 7,936,546 | B2 | 5/2011 | Vorenkamp et al. |
| 7,940,809 | B2 | 5/2011 | Lee |
| 7,958,286 | B2 | 6/2011 | Bresemann et al. |
| 8,122,159 | B2 | 2/2012 | Monreal |
| 8,159,927 | B2 | 4/2012 | Shakiba et al. |
| 8,355,327 | B2* | 1/2013 | Lida et al. ............... 370/235 |
| 8,509,321 | B2 | 8/2013 | Alon et al. |
| 8,635,473 | B2 | 1/2014 | Karam et al. |
| 8,659,986 | B1 | 2/2014 | Martinson et al. |
| 8,787,562 | B2 | 7/2014 | Binder et al. |
| 8,799,537 | B1* | 8/2014 | Zhu ............... G06F 13/385 710/14 |
| 2002/0144165 | A1 | 10/2002 | Wright et al. |
| 2002/0171741 | A1 | 11/2002 | Tonkin et al. |
| 2003/0035049 | A1* | 2/2003 | Dickens et al. ............... 348/100 |
| 2003/0043771 | A1 | 3/2003 | Mizutani et al. |
| 2003/0048852 | A1* | 3/2003 | Hwang et al. ............ 375/240.26 |
| 2004/0073697 | A1 | 4/2004 | Saito et al. |
| 2004/0177197 | A1 | 9/2004 | McLeod |
| 2004/0203296 | A1 | 10/2004 | Moreton et al. |
| 2004/0267974 | A1 | 12/2004 | Dunstan |
| 2005/0004708 | A1 | 1/2005 | Goldenberg et al. |
| 2005/0018596 | A1 | 1/2005 | Washburn et al. |
| 2005/0080935 | A1 | 4/2005 | Fukae et al. |
| 2005/0132109 | A1 | 6/2005 | Steger |
| 2005/0144345 | A1 | 6/2005 | Nakano |
| 2006/0026651 | A1* | 2/2006 | Kwon et al. ............... 725/80 |
| 2006/0085627 | A1* | 4/2006 | Noorbakhsh .......... G09G 5/363 713/1 |
| 2006/0100799 | A1 | 5/2006 | Karam |
| 2006/0164098 | A1 | 7/2006 | Su |
| 2006/0209892 | A1* | 9/2006 | MacMullan ........... H04N 5/775 370/468 |
| 2007/0011375 | A1 | 1/2007 | Kumar |
| 2007/0200859 | A1 | 8/2007 | Banks et al. |
| 2007/0201546 | A1* | 8/2007 | Lee ................ 375/229 |
| 2007/0257923 | A1 | 11/2007 | Whitby-Strevens |
| 2008/0005433 | A1 | 1/2008 | Diab et al. |
| 2008/0008470 | A1 | 1/2008 | Lin et al. |
| 2008/0028120 | A1 | 1/2008 | McLeod |
| 2008/0129879 | A1 | 6/2008 | Shao et al. |
| 2008/0129882 | A1* | 6/2008 | Moriyama ............... G06F 3/14 348/723 |
| 2008/0150718 | A1 | 6/2008 | Apfel |
| 2008/0293365 | A1* | 11/2008 | Sim et al. ............... 455/67.14 |
| 2008/0301748 | A1 | 12/2008 | Lida et al. |
| 2008/0317181 | A1 | 12/2008 | Suzuki et al. |
| 2009/0013366 | A1 | 1/2009 | You et al. |
| 2009/0141180 | A1* | 6/2009 | Kondo ................ G09G 5/006 348/723 |
| 2009/0147864 | A1* | 6/2009 | Lida ................ H04L 5/143 375/257 |
| 2009/0157885 | A1* | 6/2009 | Takatsuji ............ H04L 12/282 709/228 |
| 2009/0177818 | A1* | 7/2009 | Shim et al. .................... 710/100 |
| 2009/0177820 | A1* | 7/2009 | Ranade ............... G09G 5/006 710/106 |
| 2009/0245345 | A1* | 10/2009 | Lee et al. ................ 375/240.01 |
| 2009/0248918 | A1 | 10/2009 | Diab et al. |
| 2009/0251605 | A1 | 10/2009 | Hsiao |
| 2009/0260043 | A1 | 10/2009 | Tatsuta et al. |
| 2009/0296731 | A1* | 12/2009 | Lida ................... G06F 3/1454 370/449 |
| 2010/0073574 | A1* | 3/2010 | Nakajima et al. ............ 348/723 |
| 2010/0085482 | A1* | 4/2010 | Toba ................... G09G 5/006 348/554 |
| 2010/0100200 | A1 | 4/2010 | Kim et al. |
| 2010/0132001 | A1* | 5/2010 | Kitano .................. H04N 5/775 725/118 |
| 2010/0142723 | A1* | 6/2010 | Bucklen ........................ 381/81 |
| 2010/0165912 | A1* | 7/2010 | Funabiki .......... H04N 21/43637 370/328 |
| 2010/0283324 | A1 | 11/2010 | Lee et al. |
| 2011/0019623 | A1* | 1/2011 | Funabiki ................ G09G 5/006 370/328 |
| 2012/0203937 | A1* | 8/2012 | Mohanty ............... G06F 13/385 710/16 |
| 2014/0115110 | A1* | 4/2014 | Altmann ....................... 709/217 |

FOREIGN PATENT DOCUMENTS

| | | |
|---|---|---|
| CN | 1993948 A | 7/2007 |
| CN | 101032113 | 9/2007 |
| CN | 101436871 A | 5/2009 |
| CN | 101557488 A | 10/2009 |
| EP | 0166441 | 1/1986 |
| EP | 1473941 | 3/2004 |
| JP | 11-112524 A | 4/1999 |
| JP | 2005-129010 A | 5/2005 |
| JP | 2009-124705 A | 6/2009 |
| JP | 2009-55306 A | 9/2010 |
| KR | 10-2005-0012310 | 2/2005 |
| WO | WO-2009/098933 | 8/2009 |

OTHER PUBLICATIONS

Supplementary European Search Report completed Nov. 4, 2013, in European Patent Application No. EP11733339, 9 pages.
Universal Serial Bus 3.0 Specification (including errata and ECNs through May 1, 2011), Revision 1.0, Hewlett Packard Company et al., Jun. 6, 2011, 531 pages.
Universal Serial Bus Specification, Revision 2.0, Compaq Computer Corporation et al., Apr. 27, 2000, 650 pages.
"Super Booster Plus for HDMI 1.3 User Manual," www.gefen.com, Aug. 24, 2009, pp. 1-9, XP002715620, retrieved from the Internet: URL:https://web.archive.org/web/20090824082648/http://www.gefen.com/pdf/EXT-HDMI1.3-141SBP.pdf [retrieved on Oct. 28, 2013].
Extended European Search Report dated Oct. 29, 2013, in European Patent Application No. 11733338.5, 14 pages.
"Electrical Transient Immunity for Power-Over-Ethernet," Application Report, SLVA233A, Texas Instruments, Apr. 2006, Revised Aug. 2006, 20 pages.
"Introduction to DiiVA Designed Specifically for Home Entertainment Networking," DiiVA Licensing LLC, 2010, 4 pages.
Decision on Rejection dated Feb. 5, 2013 (+ English translation), in Chinese Patent Application No. 200980100976.3, 16 pages.
Digital Visual Interface DVI Revision 1.0, Digital Display Working Group, Apr. 2, 1999, 76 pages.
DiiVA Specification 1.1 Draft A, DiiVA Promoters Group, distribution date Jan. 7, 2010, 188 pages.
DisplayPort Ver. 1.2 Overview, DisplayPort Developer Conference, Taipei, Dec. 6, 2010, 33 pages.
High-Definition Multimedia Interface Specification Version 1.3, HDMI Licensing, LLC, Jun. 22, 2006, 237 pages.

(56) References Cited

OTHER PUBLICATIONS

International Search Report and Written Opinion in International Patent Application No. PCT/US2009/038077.
International Search Report and Written Opinion of the International Searching Authority dated Jun. 29, 2010, in International Patent Application No. PCT/US2009/067744, 10 pages.
International Search Report and Written Opinion of the International Searching Authority dated Sep. 27, 2011, in International Patent Application No. PCT/US11/21031.
International Search Report and Written Opinion of the International Searching Authority dated Sep. 28, 2011, in International Patent Application No. PCT/US2011/021030.
Microprocessor and Microcomputer Standards Committee of the IEEE Computer Society, "IEEE P1394r Draft 1 Draft Standard for High Performance Serial Bus", 2007.
Office Action dated Jan. 31, 2012 (+ English translation), in Chinese Patent Application No. 200980100976.3, 21 pages.
Office Action dated Jul. 24, 2013 (+ English translation), in Taiwan Patent Application No. 098142426, 12 pages.
Office Action dated Jul. 31, 2012 (+ English translation), in Taiwan Patent Application No. 098110096, 35 pages.
Office Action dated Mar. 30, 2012 (+ English translation), in Chinese Patent Application No. 200980105447.2, 16 pages.
Office Action dated Nov. 29, 2012 (+ English translation), in Chinese Patent Application No. 200980105447.2, 8 pages.
Office Action dated Sep. 13, 2012 (+ English translation), in Chinese Patent Application No. 200980100976.3, 21 pages.
Office Action for Patent Application No. 2011-501975 (Jul. 22, 2013).
Office Action mailed Feb. 1, 2013, in U.S. Appl. No. 12/636,063, 9 pages.
Chinese First Office Action, Chinese Application No. 201180005935.3, Aug. 27, 2014, 14 pages.
Japanese Office Action, Japanese Application No. 2012-549056, Jul. 8, 2014, 5 pages (with English Summary).
Japanese Office Action, Japanese Application No. 2012-549055, Oct. 7, 2014, 6 pages (with English Summary).
Chinese First Office Action, Chinese Application No. 201180005909.0, Dec. 17, 2014, 19 pages.
Chinese Second Office Action, Chinese Application No. 201180005935.3, May 5, 2015, 17 pages.
European Examination Report, European Application No. 11733339.3, Feb. 11, 2015, 5 pages.
Anonymous: "HDMI 1.4: HDMI Ethernet Channel," Nov. 26, 2009, pp. 1-3, [Online] [Retrieved on Jan. 30, 2015] Retrieved from the Internet<URL:https://web.archive.org/web/20091126015121/http://www.hdmi.org/manufacturer/hdmi_1_4/hec.aspx>.
European Summons to Attend Oral Proceedings Pursuant to Rule 115(1) EPC, European Application No. 11733339.3, Dec. 3, 2015, 5 pages.
"Differential Signaling," Wikipedia, Last Modified Sep. 29, 2014, [Online] [Retrieved on Oct. 8, 2014] Retrieved from the Internet<URL:http://en.wikipedia.org/wiki/Differential_signaling>.
"High-Pass Filter," Wikipedia, Last Modified Jun. 4, 2014, [Online] [Retrieved on Oct. 8, 2014] Retrieved from the Internet <URL:http://en.wikipedia.org/wiki/High-pass_filter>.
Chinese Second Office Action, Chinese Application No. 201180005909.0, Oct. 29, 2015, 19 pages.
Chinese Third Office Action, Chinese Application No. 201180005935.3, Nov. 18, 2015, 10 pages.
Chinese Third Office Action, Chinese Application No. 201180005909.0, May 6, 2016, 9 pages (with concise explanation of relevance).

* cited by examiner

Types of HLCS Command Packet

| Bits | Description |
|---|---|
| [7:4] | Command Type<br>0000 = Ping<br>0001 = SetSpeedGrade<br>0010 = StartTest<br>0011 = BackwardTraining<br>0100 = EnterNormal<br>0101 = Suspend<br>0110 = Wakeup<br>0111 = SetConfig<br>1000 = HandOver<br>1001 = HLTXTest<br>1010 = HLRXTest<br>1011 = VLTXTest<br>1100 = VLRXTest<br>1101 = (Reserved)<br>1110 = (Reserved)<br>1111 = FastReset |
| [3:0] | Parameters<br>The meaning of this filed depends on the command type. |

FIG. 3B

Table  Hybrid Link Packet Format

| Word | Byte0 (31–24) | Byte1 (23–16) | Byte1 (15) | Byte2 (8) | Byte3 (7–0) | |
|---|---|---|---|---|---|---|
| 0 | Reserved | CH_ID | DEST_SID | DEST_DDA[47..32] | | Header |
| 1 | DEST_DDA[31..0] | | | | | |
| 2 | Reserved | Reserved | INIT_SID | INIT_DDA[47..32] | | |
| 3 | INIT_DDA[31..0] | | | | | |
| 4 | TTL | Flags | | CH_RDY | | |
| 5 | SSINFO | | | | | |
| 6 | Reserved | | | | | |
| 7 | Reserved | | | Payload Length | | |
| 8 | Payload Word 0 | | | | | Payload |
| 9 | Payload Word 1 | | | | | |
| ... | ... | | | | | |
| N | Payload Word N | | | | | |
| N+1 | CRC-32 | | | | | Tail |

FIG. 5

$$\text{Freq}_{\text{SYMBOL}} = \left(\frac{\text{bpp}}{\text{num\_lane} \times 8}\right) \times \text{Freq}_{\text{PIXEL}}$$

FIG. 6A

Table  Symbol Frequency vs. Pixel Frequency

| Bit Width of a Pixel (bpp) | Symbol Frequency (Freq $_{\text{SYMBOL}}$) | | |
|---|---|---|---|
| | num_lane = 1 | num_lane = 2 | num_lane = 3 |
| 16 bits | 2.0 x Freq $_{\text{PIXEL}}$ | 1.0 x Freq $_{\text{PIXEL}}$ | 0.75 x Freq $_{\text{PIXEL}}$ |
| 24 bits | 3.00 x Freq $_{\text{PIXEL}}$ | 1.50 x Freq $_{\text{PIXEL}}$ | 1.00 x Freq $_{\text{PIXEL}}$ |
| 30 bits | 3.75 x Freq $_{\text{PIXEL}}$ | 2.25 x Freq $_{\text{PIXEL}}$ | 1.25 x Freq $_{\text{PIXEL}}$ |
| 36 bits | 4.50 x Freq $_{\text{PIXEL}}$ | 2.25 x Freq $_{\text{PIXEL}}$ | 1.50 x Freq $_{\text{PIXEL}}$ |
| 48 bits | 6.00 x Freq $_{\text{PIXEL}}$ | 3.00 x Freq $_{\text{PIXEL}}$ | 2.00 x Freq $_{\text{PIXEL}}$ |

FIG. 6B

Table  Video Training Request Packet Description

| Function | Video Training Signal Request | | |
|---|---|---|---|
| DEST_DDA | Neighbor Address (48h'FFFFFFFFFFFE) | | |
| INIT_DDA | Sender's Address | | |
| Sink SID | Display ID of display device. | | |
| Sink DDA | Address of Display device for the Video content | | |
| Source SID | Video stream ID of video source device. | | |
| Source DDA | Address of Source device for the Video content | | |
| Video Timing Flags | Flags related to video timing information. | | |
| | Flag | bits | Description |
| | V Sync Polarity | 0 | Polarity of V Sync. 0: Positive 1: Negative |
| | H Sync Polarity | 1 | Polarity of H Sync. 0: Positive 1: Negative |
| | Interlaced | 2 | 1 If video is interlaced. |
| | Reserved | 3 | Not used(0) |
| | 3D Mode | 6-4 | 000=Frame Packing<br>001=Field Alternative<br>010=Line Alternative<br>011=Side-by-Side (Full)<br>100=L + Depth<br>101=L + Depth + Graphics + Graphics-depth<br>110=Side-by-Side (Half, horizontal sub-sampling)'<br>111=Side-by-Side (Half, quincunx matrix sub-sampling)' |
| | Dimensions | 7 | Number of Dimensions. 0: 2D  1: 3D |
| H Freq | <TBD> | | |
| H Active | Refer to Video Format Timings in CEA-861-E. | | |
| V Active | Refer to Video Format Timings in CEA-861-E. | | |
| H Front | Refer to Video Format Timings in CEA-861-E. | | |
| H Sync | Refer to Video Format Timings in CEA-861-E. | | |
| H Back | Refer to Video Format Timings in CEA-861-E. | | |
| V Front | Refer to Video Format Timings in CEA-861-E. | | |
| V Sync | Refer to Video Format Timings in CEA-861-E. | | |
| V Back | Refer to Video Format Timings in CEA-861-E.<br>High 4 bits are reserved fields. | | |

FIG. 7

Table   Video Training Request Packet Format

| Word | Byte0 31    24 | Byte1 23    16 | Byte2 15    8 | Byte3 7    0 |
|---|---|---|---|---|
| ... | | | | |
| 5 | 8h'18 | Reserved | | |
| ... | | | | |
| 8 | Reserved for Sink DDA | Sink SID | Sink DDA[47..32] | |
| 9 | Sink DDA[31..0] | | | |
| 10 | Reserved for Source DDA | Src SID | INIT_DDA[47..32] | |
| 11 | INIT_DDA[31..0] | | | |
| 12 | Video Timing Flags | Reserved | H Active | |
| 13 | V Active | | H Front <TBD add H Freq digit 0> | |
| 14 | H Sync <TBD add H Freq digit 1> | | H Back <TBD add H Freq digit 2> | |
| 15 | V Front | V Width | <TBD add VIC, placeholder to help define timings for 4Kx2K displays> | V Back |

FIG. 8

Table    Encapsulated Ethernet Packet

| Word | Byte0 (31..24) | Byte1 (23..16) | | Byte2 (15..8) | Byte3 (7..0) |
|---|---|---|---|---|---|
| 0 | Reserved | CH_ID (=4) | DEST_SID (=0) | DEST_DDA[47..32] | |
| 1 | DEST_DDA[31..0] | | | | |
| 2 | Reserved | | INIT_SID (=0) | INIT_DDA[47..32] | |
| 3 | INIT_DDA[31..0] | | | | |
| 4 | TTL | Flags | | CH_RDY | |
| 5 | DEST_ETAG | INIT_ETAG | Reserved | | |
| 6 | Reserved | | | | |
| 7 | Reserved | | | Payload Length | |
| 8 | Enet Header bytes 0 - 3 | | | | |
| 9 | Enet Header bytes 4 - 7 | | | | |
| 10 | Enet Header bytes 8 - 11 | | | | |
| 11 | Enet Header bytes 12,13, Enet Payload bytes 0,1 | | | | |
| ... | ... | | | | |
| N | DCL Packet Payload Word #N (last bytes of Enet Payload and possible pad bytes) | | | | |

VIDEO MANAGEMENT AND CONTROL IN HOME MULTIMEDIA NETWORK

CROSS-REFERENCE TO RELATED APPLICATIONS

The present application is based upon, and claims the benefit of priority under 35 U.S.C. §119, to co-pending U.S. Provisional Patent Application No. 61/294,476 (the "'476 provisional application"), filed Jan. 12, 2010 and entitled "Multi-Media Data Transfer And Network Management Over A Cable Having Both Bi-Directional And Uni-Directional links." The content of the '476 provisional application is incorporated herein by reference in its entirety as though fully set forth.

The present application is related to U.S. patent application Ser. No. 12/057,051, entitled "Bi-Directional Digital Interface For video And Audio (DIVA)," filed Mar. 27, 2008, and U.S. patent application Ser. No. 12/636,063, entitled "Power Delivery Over Digital INTERFACE FOR VIDEO AND AUDIO (DiiVA)," filed Dec. 11, 2009. Both applications are incorporated herein by reference in their entireties.

BACKGROUND

DiiVA (Digital Interactive Interface For video And Audio) is a bi-directional audio/video interface that allows uncompressed high-definition video, as well as multi-channel audio, and bi-directional high-bandwidth data to be transferred over a single cable. In addition to uni-directional video channels links dedicated to carrying noncompressed video pixel data and synchronization, DiiVA implements a bi-directional hybrid data channel capable of transporting different types of data, including but not limited to audio data, control data, Ethernet data, and bulk data.

DiiVA can provide enhanced functionality for many applications, including without limitation video management and control in home multimedia networks.

BRIEF DESCRIPTION OF THE DRAWINGS

The drawings disclose illustrative embodiments. They do not set forth all embodiments. Other embodiments may be used in addition or instead. When the same numeral appears in different drawings, it is intended to refer to the same or like components or steps.

FIG. 3B illustrates an example list of the hybrid link control packet.

FIG. 5 illustrates a packet used to transmit data over the hybrid link, in accordance with one embodiment of the present disclosure.

FIG. 6A provide an equation that mathematically relates symbol frequency to pixel frequency, bit per pixel, and number of lanes.

FIG. 6B provides a table illustrating the correspondence among the symbol frequency, the pixel frequency, bit per pixel, and number of lanes FIG. 7 provides a table that describes a video training request packet.

FIG. 8 is a table that shows a video training request packet format.

FIG. 9 is a table that shows an encapsulated Ethernet packet.

DESCRIPTION

In the present disclosure, methods and systems are disclosed relating to video management and control in home multimedia networks. Illustrative embodiments are discussed. Other embodiments may be used in addition or instead.

DiiVA, a bi-directional audio/video interface that implements a bi-directional hybrid data channel capable of transporting control data as well as other types of data including without limitation audio data, Ethernet data, and bulk data, allows users to connect, configure and control a plurality of consumer electronic devices (including without limitation DVD players, digital video recorders, set top boxes, personal computers, camcorders, cameras, and home stereo systems, just by way of example) from their digital TV or other DiiVA device.

Full details regarding DiiVA is provided in Exhibit 1 of the '476 provisional application, the contents of which have been incorporated herein by reference in their entireties.

Figure 1:
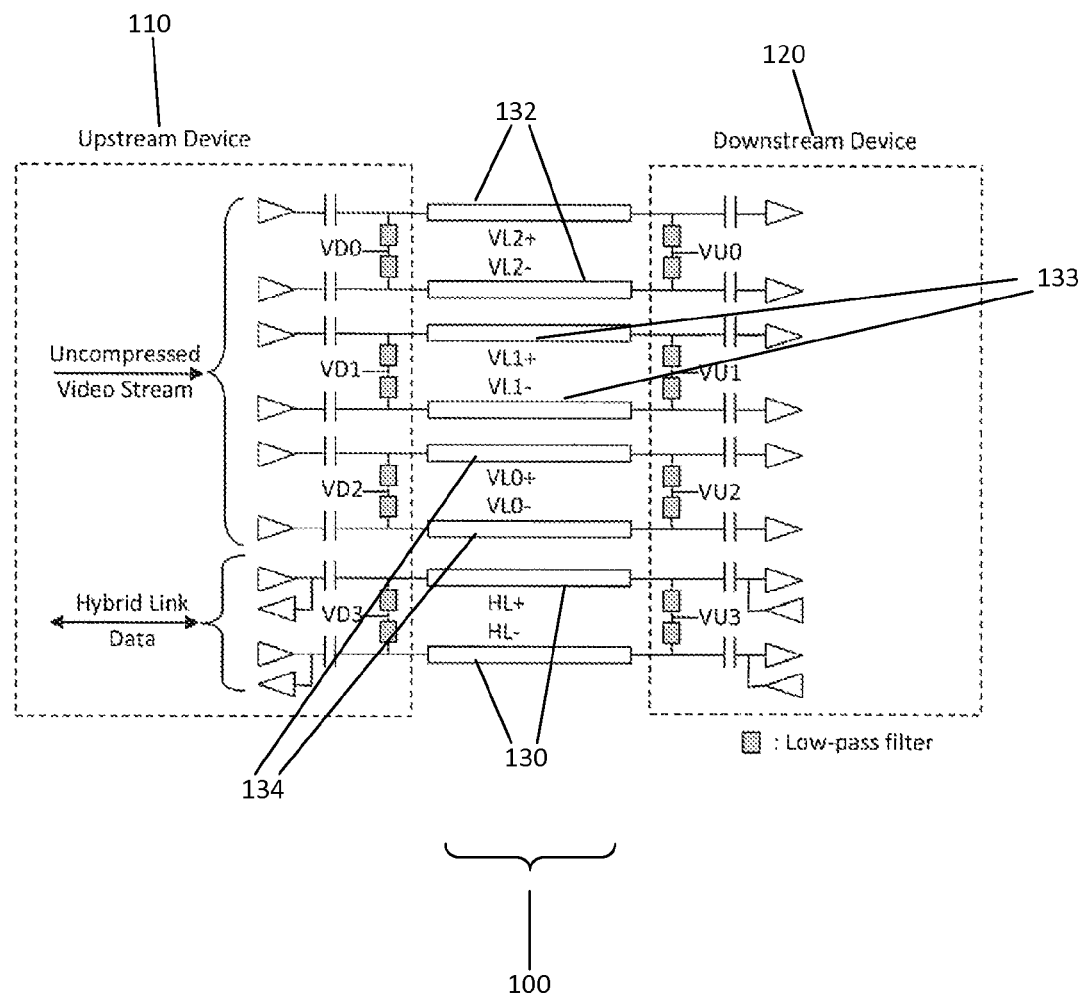
FIG. 1 is a schematic diagram of a DiiVA link.

FIG. 1 is an electrical connection diagram of a DiiVA link, in accordance with one embodiment of the present disclosure. A DiiVA link is a connection between two DiiVA devices. In some embodiments, such as the embodiment illustrated in FIG. 1, a DiiVA link consists of a video link and a hybrid link. The video link is uni-directional (downstream) and has three video lanes: VLO, VL1, and VL2 (shown in FIG. 1 with reference numerals 132, 133, and 134, respectively), corresponding to three separate differential pairs. The hybrid link is half-duplex bidirectional and uses a single differential pair. As shown in FIG. 1, all four pairs are AC coupled on both sides of the cable. In the illustrated embodiment, each differential pair is electrically terminated inside both the VO port and the VI port with a 50-ohm termination, although in other embodiments different ways of electrically terminating the differential pairs may be used.

The DC level of each pair is determined by separate voltage references: VU0, VU1, VU2, VU3, VD0, VD1, VD2, and VD3. The voltage references are isolated from the differential signaling by high frequency block filters such as ferrite beads. DC power is delivered over the DiiVA connection to activate repeater or relay devices and small mobile devices.

In some embodiments, the DiiVA PHY (physical layer) consists of a Video Link PHY and a Hybrid Link PHY. Each PHY has a logical sub-layer and an electrical sub-layer The Hybrid Link is a half-duplex link with a di reaction change after every packet frame. Each packet includes a header, a payload and CRC.

Figure 2:
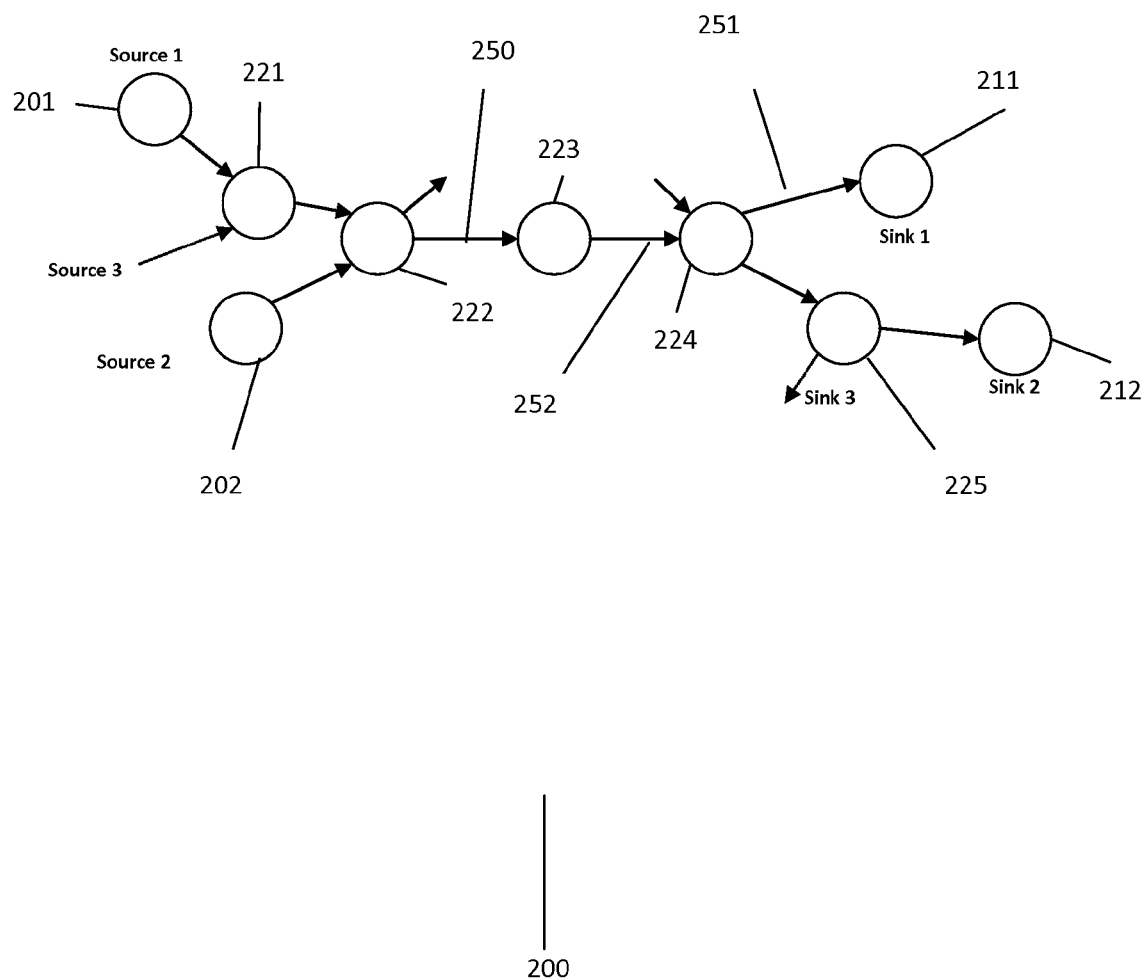
FIG. 2 is a schematic block diagram of a system that relays video content, in accordance with one embodiment of the present disclosure.

FIG. 2 is a schematic block diagram of a system 200 that relays video content, in accordance with one embodiment of the present disclosure. In overview, the system 200 includes at least one video source (shown in FIG. 2 with reference numerals 201 and 202, respectively), at least one video sink (shown in FIG. 2 with reference numerals 211 and 212, respectively); and one or more links connecting the video source (201 or 202) to the video sink (211 or 212). Some of the links are indicated in FIG. 2 with reference numerals 250, 251, and 252, respectively. The system further includes at least one intermediate hop (shown in FIG. 2 with reference numerals 222, 223, 224, and 225) between the video source (201 or 202) and the video sink (211 or 212). The intermediate hops are configured to relay video content from the video source to the video sink through the links, using one or more data relay modes. Each intermediate hop includes a video transmitter, a video receiver, or both.

While a video source is illustrated, more generally any transmitting device may be used. While a video sink is illustrated, more generally any receiving device may be used.

Using DiiVA, a number of sources, switches and other devices can be connected between a video source and a video sink. Devices between an active video source and the video sink are responsible for retransmitting the video data while maintaining full hybrid link operation. The source, sink, and the links include a processor or controller configured to implement the functionalities described in the present disclosure.

In some embodiments of the present disclosure, the data relay modes comprise at least one of: a resampling mode; and a buffering mode. During the resampling mode, one or more input signals are sampled with a clock and relayed to an output. During the buffering mode, the input signals are equalized, amplified and relayed to the output, without using any local clock.

In some embodiments, in the resampling relay mode the VI port PHY recovers the clock information from the video data stream with the video Clock Recovery Unit (CRU). The recovered clock information, in some cases after some further processing, is used to resample the received video data and to retransmit it onto the VO port. This operation counteracts some types of signal degradation on the cable, connector, and PCB lines. During the resampling mode, the receiver is in full-operation mode.

In some embodiments, in the buffering relay mode, the PHY improves the signal integrity of the downstream data without resampling. In some embodiments, the buffering relay mode may be used in a cable signal booster to extend cable length.

In some embodiments, one or more of the intermediate hops operates in only one of the data relay modes. In some embodiments, one or more of the intermediate hops relays the video content in more than one of the operational modes.

In some embodiments, the video source and the intermediate hop select the data relay modes for some or all of the intermediate hops.

In some embodiments, the video source communicates the selection of the data relay mode, using a message that propagates downstream from the video source to the video sink through the intermediate hops.

In some embodiments, that message may contain a data item that is initialized by the video source to indicate the desired data relay mode for the first intermediate hop.

In some embodiments, rules may be established for the behavior of each intermediate hop in such a way that each intermediate hop modifies the data item (such as sequence/selection field) between its receiver and its transmitter such that the next intermediate hop receives a desired value and thus selects a desired relay mode.

In other embodiments, additional rules may be established that require resetting the value of the data item (sequence/selection field) to a particular value when the hop is unable to operate in certain data relay modes.

Further details of video relaying using the intermediate hops are described in Exhibits 1 and 2 of the '476 provisional application, the contents of which have been incorporated by reference herein in their entireties.

In some embodiments of the present disclosure, the hybrid link between the transmitting device and the receiving device is a DiiVA half-duplex link with a direction change after every packet frame. Each packet frame is composed of direction identifier, a preamble of fifty D10.2 symbols, four SOP symbols, the packet, and four EOP symbols. The packet is composed of a header, a payload and CRC.

In some embodiments of the present disclosure, HLCS (Hybrid Link Control Signaling) is used to support management operations which include, without limitation: Connection/Disconnection detection; speed grade negotiation; PHY parameter optimization; and power management.

In these embodiments, a system may be used that includes a first device (which may be a source device in some embodiments), a second device (which may be a sink device in some embodiments), and a hybrid link that connects the first device to the second device and that performs hybrid link control signaling (HLCS).

Figure 3A:
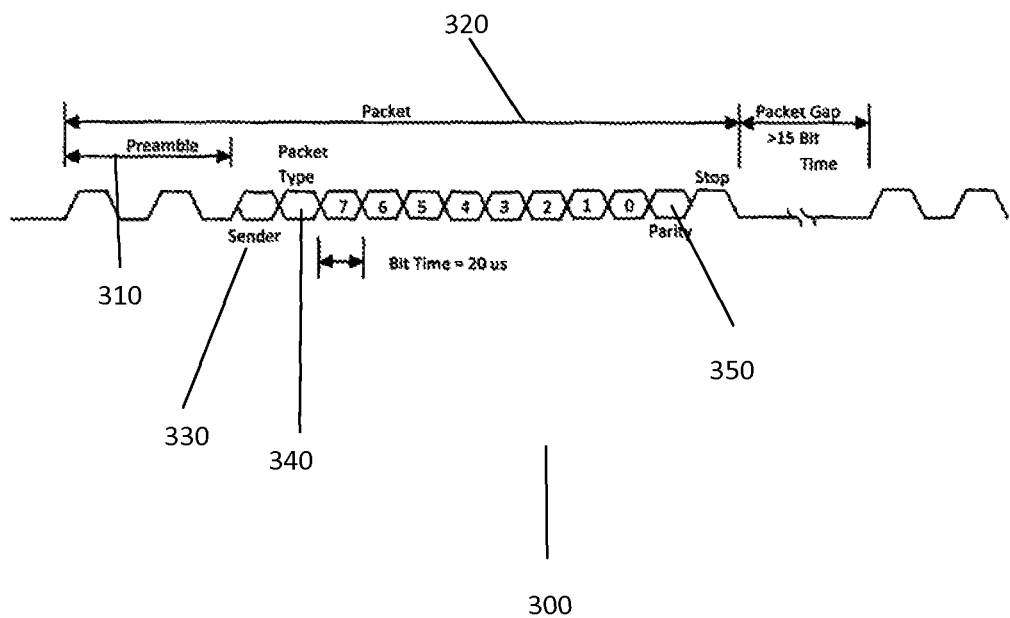
FIG. 3A illustrates a timing diagram of a hybrid link control packet, in accordance with one embodiment of the present disclosure.

FIG. 3A illustrates an example of a hybrid link HLCS packet 300, in accordance with one embodiment of the present disclosure. The extent of the packet is illustrated through reference numeral 320. In the illustrated embodiment, the HLCS packet 300 includes: a 4-bit Preamble 310 (1010); a 1-bit Sender indicator 330 (1 if Leader, 0 if Follower); a 1-bit Packet type indicator 340 (1 if command packet, 0 if data packet); 8-bit data (MSb (Most Significant bit) first) following the Packet type indicator 340; 1-bit Parity bit 350 (XOR of Sender indicator, Packet type indicator, Data bits), and 1-bit Stop bit (1).

As seen in FIG. 3A, in some embodiments the hybrid link performs HLCS with a burst of signal transitions. The hybrid link may use the presence and absence of said burst to indicate 1 and 0 values. The hybrid link may use one or more sequences of 1 and 0 values to communicate a message across the hybrid link.

FIG. 3B provides a table that shows 8-bit data encoding of HLCS command packets, in one embodiment of the present disclosure.

In some embodiments, when the VO port and VI port are communicating with HLCS, each port can be in one of the following states:
  i) Reset;
  ii) Initialization state, Init;
  iii) Forward training, Ftrain;
  iv) Backward training, Btrain;
  v) Normal operation state, P0;
  vi) Shallow/Deep Suspended state, P1/P2

The VO port and VI port, when communicating with HLCS, may use Leader/Follower-based half-duplex communication, in which VO port takes the role of Leader and VI port takes the role of Follower, except in the case in which Test equipment is attached to VO port.

Figure 4:
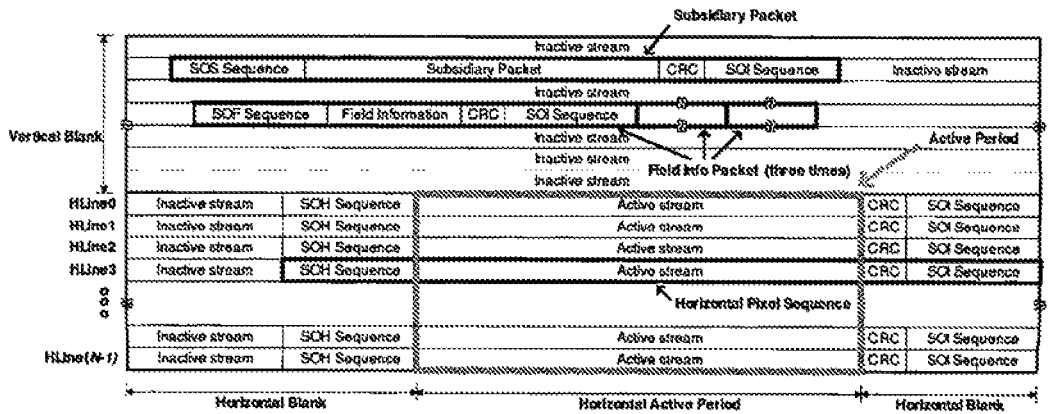
FIG. 4 illustrates a video frame in a video link, in accordance with one embodiment of the present disclosure.

Further details regarding HLCS are provided in Exhibit 1 of the '476 provisional application, the contents of which have been incorporated herein by reference in their entireties FIG. 4 illustrates a video frame in a video link, in accordance with one embodiment of the present disclosure. The Video Link transports the video data as a stream composed of video frames, as shown in FIG. 4. Each video frame corresponds to one frame in the progressive mode and one field in the interlaced mode. In some embodiments, control sequences (i.e., SOF and SOH Sequence) are used to indicate the video timing and are repeated four times to ensure robust detection of the symbols.

In some embodiments, a method of video pixel packing may include: selecting a number of video lanes to be supported in a video link that connects a video source device to a video sink device. The selection may be made based on at least one of: device capability of the video sink device; result of a physical layer (PHY) training; and video pixel rate and video pixel size.

The method may further include reading the device capability through a hybrid link command channel between the video source device and the video sink device. The result of the PHY training may include a property of a cable or cables that connect the video source device to the video sink device through the intermediate hop or hops.

Further details regarding the video pixel packing method are provided in Exhibit 1 of the '476 provisional application, the contents of which have been incorporated herein by reference in their entireties.

In overview, the hybrid link (130) in DiiVA provides bi-directional (half-duplex) data service in packets with variable-length payloads and fixed-sized headers and tails, in some embodiments of the present disclosure. In these embodiments, the underlying physical data link is point-to-point from a VI port on one device to a VO port on another. In exchanging data packets with the other side of the link, each of these two ports may take turns being in transmitter mode while the other side is in receiver mode. While the underlying physical layer is inherently uni-directional, the alternating direction of transmission allows the Hybrid Link to provide a logically bi-directional (i.e., half-duplex) data service.

In some embodiments, the hybrid link may be used to carry command/status information, audio streams and USB and Ethernet data. The hybrid link may include a number of subchannels, including without limitation one or more audio subchannels, command subchannels, and data subchannels.

FIG. 5 illustrates a packet 500 used to transmit data over the hybrid link, in accordance with one embodiment of the present disclosure. The general hybrid link packet format is shown in FIG. 5. As shown in FIG. 5, the packet 500 used to transmit data over the hybrid link may include a header 530, a payload 520, and a tail 510. In the illustrated embodiment, the header is fixed in size and includes initiator and destination addresses and transmission parameters. In the illustrated embodiment, the payload includes user data, which is variable in size, up to a maximum of 1984 bytes, while the tail is a 32-bit CRC which is calculated from the header and payload, like the FCS of the Ethernet packet. Different embodiments may include other types of header, payload, and tail. In the illustrated embodiments, byte 0 of Word 0 is sent first.

The packet 500 includes a channel readiness field (CH_RDY) 550 that includes a plurality of bits adapted to indicate readiness of each one of a plurality of subchannels in the sending device. One of the bits in the field 550 may be set when a corresponding subchannel in the sending device is ready.

The channel readiness field 550 in the data packet may be used by a first device to determine the status of a second device connected to the first device by the hybrid link.

The first device may send a packet having data for the corresponding subchannel in the second device that is ready to receive the data, as indicated by the set bit in the channel readiness field 550. The destination subchannel of the packet is indicated with the packet's CH_ID field shown in FIG. 5. This data packet sent by the first device also includes a channel readiness field indicating the readiness of the first device's corresponding subchannels.

In some embodiments of the present disclosure, the video link may be configured to transmit a video stream the from video source to the video sink over one or more video lanes. The video stream may include video pixel data time-congregated in active video periods, each active video period including pixel data for a single horizontal line of video image.

In some embodiments, the video stream may be distributed across one or more video lanes within the video link.

In some embodiments, each video lane may include at least one control sequence indicating start and end of each active video period. In some embodiments, each video lane may include an error detection code for each active video period. The error detection code may be calculated by the video source from the active pixel data found on said video lane. The video sink may be configured to decode the error detection code and to determine whether the received video pixel data matches the video pixel data transmitted by the video source.

In some embodiments, the video source and the video sink may be configured to communicate one or more error recovery requests to reduce the number of errors. The error recovery requests may include one or more of:
a request to retrain video link transmitter and receiver;
a request to change the number of video lanes; and
a request to reduce video data rate by changing one of: video resolution, pixel size, and frame rate.

In embodiments of the present disclosure in which the DiiVA video link is used, data is transmitted in groups of two or three color components (where each visible pixel is described by three color components, either R, G and B or Y, Cb and Cr.) In one embodiment, this data is transmitted in groups of two or three color components, with two color components used when the pixel encoding scheme is YCbCr 4:2:2 and three color components used when the pixel encoding scheme is either RGB or YCbCr 4:4:4. The bit width of each color component (i.e., bits per component, "bpc") can be one of several. Thus, the bit width of a single pixel (i.e., bits per pixel, "bpp") is determined by the combination of the bit width of a single color component and the pixel encoding scheme. FIG. 6A provides an equation that mathematically relates symbol frequency to pixel frequency, whereas FIG. 6B provides a table illustrating the correspondence between symbol frequency and the pixel frequency.

In some embodiments of the present disclosure, a video link training may be implemented (for example, by a processor or controller) for the video link and the hybrid link. In some embodiments, the video link training may start from the video source with a first one of the plurality of links and continues to the next consecutive link toward the video sink until all links have been trained and the video sink is reached.

The processor (or controller) may implement the video link training for each one of the plurality of links using a video pixel clock derived from the video link. The results of the video link training include at least one of:
pass or fail;
detected error rate; and
a request to the source to reduce bit rate.

In some embodiments, the video source may reduce the bit rate by increasing the number of the video lanes.

FIG. 7 provides a table that describes one embodiment of video training request packet, while FIG. 8 is a table that shows a video training request packet format.

Further details regarding the video lanes, error detection, and video link training are provided in Exhibit 1 of the '476 provisional application, the contents of which have been incorporated herein by reference in their entireties.

A DiiVA device may be capable of carrying Ethernet packets across the DiiVA interface.

More generally, in some embodiments of the present disclosure, Ethernet encapsulation and routing may be performed. In these embodiments, a system may include a network that includes at least a first device, and a second device connected to the first device, each of which has a unique network address. A packet sent by one device to another may include an encapsulation of a portion of a packet from an external interface. External devices found on the external interface also contain their own external network address. In one or more embodiments, the interface connecting the second device to the first device is DiiVA in which the network address is the DiiVA Device Address.

The external interface may be one of: Ethernet; a IEEE 802.11-based interface; and a modification of the Ethernet.

In some embodiments, the encapsulation from the external interface may include an address for use within the external interface. In some embodiments, the address for use within the external interface may be an Ethernet MAC address.

In some embodiments, at least one device in the network may be configured to determine a transmit port to which the packet containing the encapsulation is transmitted, based on one of: the encapsulation of the address of the external interface; and a previously received packet that also contains an encapsulation of a portion of a packet from an external interface. The device may be configured to determine the transmit port based on matching the encapsulated external interface address of a previously-received packet with the encapsulated external interface address of the to-be-transmitted packet and choosing as a transmit port, the same port from which the previously-received matching packet was received.

In some embodiments, the device may determine the transmit port based on matching the encapsulated external interface address of a previously-received packet with the encapsulated external interface address of the to-be-transmitted packet and choosing as a transmit port, the same port from which the previously-received matching packet was received.

In other embodiments, the device may also encapsulate within the transmitted packet a specific destination tag value that is the same value as an initiator tag value retrieved from a previously received encapsulation packet having an encapsulated external interface address matching the to-be-transmitted external interface address.

In some embodiments, the device receiving the encapsulation packet may use the destination tag value to determine the internal routing destination of the encapsulation packet. In other embodiments, the device receiving the encapsulation packet sometimes de-encapsulates (or unwraps) the packet contents and recreates an external interface packet largely similar to the original packet received by the encapsulation packet transmitting device.

FIG. 9 is a table illustrating an encapsulated Ethernet packet, in accordance with one embodiment of the present disclosure. In this table, DEST_ETAG and INIT_ETAG are Ethernet-service-specific fields associated with the destination and source MAC addresses in the Ethernet payload, respectively. They may be considered as MAC address extensions made available to the Ethernet routing mechanism.

When a DiiVA device receives an Ethernet packet encapsulated in a Hybrid-Link packet addressed to it (i.e., the DEST_DDA is its DDA), it associates the source Ethernet address, the INIT_ETAG, and the INIT_DDA to the Hybrid-Link port that the packet was received on. This information may be entered into the Ethernet routing table such that when an Ethernet packet with matching destination address is received on the Ethernet interface, the associated ETAG and DDA shall be put in the DEST_ETAG and DEST_DDA field of the HL packet header being used to encapsulate the Ethernet packet.

Further details regarding Ethernet encapsulation and routing in DiiVA are provided in Exhibit 1 of the '476 provisional application, the contents of which have been incorporated herein by reference in their entireties.

In sum, in the present disclosure, methods and systems have been described relating to video management and control, and to Ethernet encapsulation and routing in DiiVA. The components, steps, features, objects, benefits and advantages that have been discussed are merely illustrative. None of them, nor the discussions relating to them, are intended to limit the scope of protection in any way.

While certain embodiments have been described, it is to be understood that the concepts implicit in these embodiments may be used in other embodiments as well. Numerous other embodiments are also contemplated, including embodiments that have fewer, additional, and/or different components, steps, features, objects, benefits and advantages. The components and steps may also be arranged and ordered differently. Nothing that has been stated or illustrated is intended to cause a dedication of any component, step, feature, object, benefit, advantage, or equivalent to the public.

In the present disclosure, reference to an element in the singular is not intended to mean "one and only one" unless specifically so stated, but rather "one or more." All structural and functional equivalents to the elements of the various embodiments described throughout this disclosure, known or later come to be known to those of ordinary skill in the art, are expressly incorporated herein by reference.

What is claimed is:

1. A system comprising:
    a transmitting device to connect to a receiving device via a video link and a hybrid link,
    wherein the transmitting device communicates with the receiving device over the hybrid link through a plurality of subchannels,
    wherein the transmitting device receives a first data packet from the receiving device over the hybrid link that comprises a first channel readiness field, the first channel readiness field including a plurality of bits, each bit indicating readiness of a different subchannel of the plurality of subchannels at the receiving device, and
    wherein the transmitting device sends a second data packet to the receiving device over the hybrid link, the second data packet comprising: data for a subchannel of the plurality of subchannels indicated as being ready by a set bit of the first channel readiness field;
    a channel ID for the subchannel indicated as being ready by the first channel readiness field; and
    a second channel readiness field including a plurality of bits, each bit indicating readiness of a different subchannel of the plurality of subchannels at the transmitting device.

2. The system of claim 1, wherein the transmitting device is a video source, and the receiving device is a video sink.

3. The system of claim 2, wherein the video source is to transmit a video stream to the video sink over one or more video lanes of the video link; and
    wherein the video stream includes video pixel data time-congregated in active video periods, each active video period including pixel data for a single horizontal line of video image.

4. The system of claim 3, wherein each video lane includes at least one control sequence indicating start and end of each active video period; and further includes an error detection code for each active video period.

5. The system of claim 4, wherein the error detection code is calculated by the video source from the active pixel data found on said video lane; and wherein the video sink is configured to decode the error detection code and to determine whether the received video pixel data matches the video pixel data transmitted by the video source.

6. The system of claim 5, wherein the video source and the video sink are configured to communicate one or more error recovery requests to reduce an error detected through the error detection code, the error recovery requests comprising one or more of:
- a request to retrain video link transmitter and receiver;
- a request to change the number of video lanes; and
- a request to reduce video pixel rate by changing one of: video resolution, pixel size, and frame rate.

7. The system of claim 2, further comprising:
at least one intermediate hop between the video source and the video sink, the intermediate hop to relay video content from the video source to the video sink through the video link using one or more data relay modes.

8. The system of claim 7, wherein the data relay modes differ by type and magnitude of one or more impacts on a property of a relayed data signal.

9. The system of claim 7, wherein the data relay modes comprise at least one of:
- a resampling mode during which one or more input signals are sampled with a clock and relayed to an output; and
- a buffering mode during which input signals are equalized, amplified and relayed to the output and during which no local clock is used.

10. The system of claim 7, wherein each intermediate hop includes at least one of: a video transmitter; and a video receiver.

11. The system of claim 7 comprising a plurality of intermediate hops, and wherein at least one of the intermediate hops is adapted to operate in only one of the data relay modes.

12. The system of claim 7 comprising a plurality of intermediate hops, and wherein at least one of the intermediate hops is adapted to operate the data relay in more than one of the operational modes.

13. The system of claim 7, wherein the transmitting device and the intermediate hop select the data relay mode for each intermediate hop.

14. The system of claim 13, wherein the transmitting device communicates the selection of the data relay mode of the intermediate hop by sending a message that propagates from the transmitting device to the receiving device through the at least one intermediate hop.

15. The system of claim 9 comprising a plurality of intermediate hops, wherein the message contains a data item initialized by the video source to indicate the desired data relay mode for the first one of the plurality of intermediate hops.

16. The system of claim 7, further comprising:
- a plurality of links between the video source and the video sink, the plurality of links comprising the video link and the hybrid link;
- wherein the video sink transmits video data from the video source to the video sink over one or more video lanes of the video link; and
- wherein the intermediate hop relays video content from the video source to the video sink through one or more of the plurality of links using one or more data relay modes; and
- a processor to implement a video link training for the video link and the hybrid link, wherein the video link training starts from the video source with a first one of the plurality of links and continues to the next consecutive link toward the video sink until all links have been trained and the video sink is reached.

17. The system of claim 16, wherein the processor individually implements the video link training for each one of the plurality of links using a video pixel clock derived from the video link.

18. The system of claim 16, wherein results of the video link training include at least one of:
- pass or fail;
- detected error rate; and
- a request to the source to reduce bit rate.

19. The system of claim 16, wherein the video source reduces the bit rate by increasing a number of the video lanes.

20. The system of claim 1, wherein the video link is unidirectional, and wherein the hybrid link is a bi-directional link, and the plurality of subchannels include a command sub-channel through which one or more control commands are transmitted.

21. The system of claim 1, wherein the transmitting device and the receiving device perform hybrid link control signaling (HLCS) to manage a physical layer of the hybrid link.

22. The system of claim 21, wherein the transmitting device and the receiving device perform the HLCS with a burst of signal transitions and to use the presence and absence of said burst to indicate 1 and 0 values.

23. The system of claim 1, wherein the transmitting device uses the first channel readiness field in the first data packet to determine the status of the receiving device.

24. The system of claim 1, wherein the subchannels include an audio subchannel, a command subchannel, and a data subchannel, and the plurality of bits in the first channel readiness field indicate readiness of at least the audio subchannel, the command subchannel, and the data subchannel.

* * * * *